(12) United States Patent
Gopalan et al.

(10) Patent No.: US 7,925,711 B1
(45) Date of Patent: Apr. 12, 2011

(54) CENTRALIZED ADAPTIVE NETWORK MEMORY ENGINE

(75) Inventors: Kartik Gopalan, Vestal, NY (US); Michael Hines, Endicott, NY (US); Jian Wang, Vestal, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 220 days.

(21) Appl. No.: 11/957,411

(22) Filed: Dec. 15, 2007

Related U.S. Application Data (60) Provisional application No. 60/870,320, filed on Dec. 15, 2006.

(51) Int. Cl.
*G06F 15/16* (2006.01)
(52) U.S. Cl. .................. 709/212; 709/216; 711/100
(58) Field of Classification Search .............. 709/214, 709/227, 200–202, 213, 215–216; 711/100, 711/105, 111
See application file for complete search history.

(56) References Cited

U.S. PATENT DOCUMENTS

| | | | | |
|---|---|---|---|---|
| 6,167,490 | A * | 12/2000 | Levy et al. .................... | 711/148 |
| 6,298,419 | B1 * | 10/2001 | Kontothanassis et al. .... | 711/147 |
| 6,766,313 | B1 * | 7/2004 | Kromann ...................... | 1/1 |
| 6,886,080 | B1 * | 4/2005 | Carey .......................... | 711/148 |
| 7,188,145 | B2 * | 3/2007 | Lowery et al. ................ | 709/214 |
| 7,320,035 | B2 * | 1/2008 | Kumar et al. ................. | 709/227 |
| 7,386,673 | B2 * | 6/2008 | van Riel ....................... | 711/133 |
| 7,536,462 | B2 * | 5/2009 | Pandya ......................... | 709/227 |
| 2002/0016840 | A1 | 2/2002 | Herzog et al. | |
| 2005/0039180 | A1 | 2/2005 | Fultheim et al. | |
| 2006/0184673 | A1 * | 8/2006 | Liebman ....................... | 709/225 |
| 2006/0190243 | A1 | 8/2006 | Barkai et al. | |
| 2007/0288530 | A1 | 12/2007 | Romem et al. | |
| 2009/0012932 | A1 | 1/2009 | Romem et al. | |
| 2009/0070337 | A1 | 3/2009 | Romem et al. | |
| 2009/0144388 | A1 | 6/2009 | Gross et al. | |
| 2009/0150511 | A1 | 6/2009 | Gross et al. | |

OTHER PUBLICATIONS

Lewandowski, Mark, "Latency Reduction Techniques for Remote Memory Access in ANEMONE", Master's Thesis, Florida State University, Spring, 2006.

(Continued)

*Primary Examiner* — Moustafa M Meky
(74) *Attorney, Agent, or Firm* — Steven M. Hoffberg; Ostrolenk Faber LLP (57) ABSTRACT

There is a constant battle to break even between continuing improvements in DRAM capacities and the growing memory demands of large-memory high-performance applications. Performance of such applications degrades quickly once the system hits the physical memory limit and starts swapping to the local disk. We present the design, implementation and evaluation of Anemone—an Adaptive Network Memory Engine—that virtualizes the collective unused memory of multiple machines across a gigabit Ethernet LAN, without requiring any modifications to the either the large memory applications or the Linux kernel. We have implemented a working prototype of Anemone and evaluated it using real-world unmodified applications such as ray-tracing and large in-memory sorting. Our results with the Anemone prototype show that unmodified single-process applications execute 2 to 3 times faster and multiple concurrent processes execute 6 to 7.7 times faster, when compared to disk based paging. The Anemone prototype reduces page-fault latencies by a factor of 19.6—from an average of 9.8 ms with disk based paging to 500 μs with Anemone. Most importantly, Anemone provides a virtualized low-latency access to potentially "unlimited" network memory resources.

10 Claims, 7 Drawing Sheets

Architecture of Anemone: The Memory Engine multiplexes client paging requests among backend memory servers through a Virtual Access Interface

OTHER PUBLICATIONS

Hines, Michael R., "Anemone: An Adaptive Network Memory Engine", Master's Thesis, Florida State University, Spring, 2005.
Hines, et al., "Anemone: Adaptive Network Memory Engine", SOSP 2005 and NSDI 2005 (poster).
Hines, et al., "Fast Transparent Cluster-Wide Paging", Spring 2006.
Hines, et al., "Anemone: Transparently Harnessing Cluster-Wide Memory", In Proc. of International Symposium on Performance Evaluation of Computer and Telecommunication Systems (SPECTS'06), Aug. 2006, Calgary, Alberta, Canada.
Acharya, et al., Availability and utility of idle memory in workstation clusters. In Measurement and Modeling of Computer Systems, pp. 35-46, 1999.
Anderson, et al., A case for NOW (Networks of Workstations). IEEE Micro, 15(1):54-64, 1995.
Anderson, et al., Serverless network file systems. In Proc. of the 15th Symp. on Operating System Principles, pp. 109-126, Copper Mountain, Colorado, Dec. 1995.
Bohannon, et al., The architecture of the dali main memory storage manager. Bell Labs Technical Journal, 2(1):36-47, 1997.
Brasileiro, et al., Using remote memory to stabilise data efficiently on an EXT2 linux file system. In Proc. of the 20th Brazilian Symposium on Computer Networks, May 2002.
Comer, et al., A new design for distributed systems: the remote memory model. Proceedings of the USENIX 1991 Summer Technical Conference, pp. 127-135, 1991.
Cuenca-Acuna, et al., Cooperative caching middleware for cluster-based servers. In Proc. of 10th IEEE Intl. Symp. on High Performance Distributed Computing (HPDC-10), Aug. 2001.
Dahlin, et al., Cooperative caching: Using remote client memory to improve file system performance. In Operating Systems Design and Implementation, pp. 267-280, 1994.
Dwarkadas, et al., Cashmere-VLM: Remote memory paging for software distributed shared memory. In Proc. of Intl. Parallel Processing Symposium, San Juan, Puerto Rico, pp. 153-159, Apr. 1999.
Feeley, et al., Implementing global memory management in a workstation cluster. Operating Systems Review, Fifteenth ACM Symposium on Operating Systems Principles, 29(5):201-212, 1995.
Flouris, et al., The network RamDisk: Using remote memory on heterogeneous NOWs. Cluster Computing, 2 (4):281-293, 1999.
Garcia-Molina, et al., Data management with massive memory: a summary. Parallel Database Systems. PRISMA Workshop, pp. 63-70, 1991.
Garcia-Molina, et al. A massive memory machine. IEEE Transactions on Computers, C-33 (5):391-399, 1984.
Ioannidis, et al., On using network memory to improve the performance of transaction-based systems. In International Conference on Parallel and Distributed Processing Techniques and Applications (PDPTA '98), 1998.
Koussih, et al., Dodo: A user-level system for exploiting idle memory in workstation clusters. In Proc. of the Eighth IEEE Intl. Symp. on High Performance Distributed Computing (HPDC-8), 1999.
Leslie, et al., The design and implementation of an operating system to support distributed multimedia applications. IEEE Journal of Selected Areas in Communications, 14(7):1280-1297, 1996.
Markatos, et al., Implementation of a reliable remote memory pager. In USENIX Annual Technical Conference, pp. 177-190, 1996.
McDonald. Remote paging in a single address space operating system supporting quality of service. Tech. Report, Dept. of Computing Science, University of Glasgow, Scotland, UK, 1999.
POV-RAY. The persistence of vision raytracer, 2005.
Silicon Graphics, Inc. STL Quicksort www.sgi.com/tech/stl/sort.html.
E. Stark. Samson: A scalable active memory server on a network, Aug. 2003.
Wong, et al., My cache or yours? Making storage more exclusive. In Proc. of the USENIX Annual Technical Conference, pp. 161-175, 2002.
Xiao, et al., Incorporating job migration and network RAM to share cluster memory resources. In Proc. of the 9th IEEE Intl. Symposium on High Performance Distributed Computing (HPDC-9), pp. 71-78, Aug. 2000.
Amza, et al., Treadmarks: Shared memory computing on networks of workstations.IEEE Computer, 29(2):18-28, Feb. 1996.
NS2: Network Simulator. http://www.isi.edu/nsnam/ns/.

* cited by examiner

Figure 1: Architecture of Anemone: The Memory Engine multiplexes client paging requests among backend memory servers through a Virtual Access Interface Figure 2: Latency distributions for random reads.

Figure 3: Latency distributions for sequential reads.

Figure 4: Comparison of execution times of POV-ray for increasing problem sizes.

Figure 5: Comparison of execution times of STL Quick-sort for increasing problem sizes.

Figure 6: Comparison of execution times of multiple concurrent processes executing POV-ray for an increasing number of processes.

Figure 7: Comparison of execution times of multiple concurrent processes executing STL Quick-sort for an increasing number of processes.

CENTRALIZED ADAPTIVE NETWORK MEMORY ENGINE

RELATED APPLICATIONS

The present application claims benefit of priority from U.S. Provisional Patent Application No. 60/870,320, filed Dec. 15, 2006, the entirety of which is expressly incorporated herein by reference.

This invention was developed in part under National Science Foundation Grant No. 0509131.

1 INTRODUCTION

Rapid improvements in DRAM capacities have been unable to keep up with the unprecedented the growth in memory demands of applications, such as multimedia/graphics processing, high resolution volumetric rendering, weather prediction, large-scale simulations, and large databases. The issue is not whether one can provide enough DRAM to satisfy these modern memory-hungry applications; rather, provide more memory and they'll use it all up and ask for even more. Simply buying more memory to plug into a single machine is neither sustainable nor economical for most users because (1) the price per byte of DRAM within a single node increases non-linearly and rapidly, (2) memory bank limitations within commodity nodes prevent unrestricted scaling and (3) investment in specialized large memory hardware is prohibitively expensive and such technology quickly becomes obsolete.

In this constant battle to break-even, it does not take very long for large memory applications to hit the physical memory limit and start swapping (or paging) to physical disk, which in turn throttles their performance. At the same time, it is often the case that while memory resources in one machine might be heavily loaded, large amounts of memory in other machines in a high-speed LAN might remain idle or under-utilized. In typical commodity clusters, one often sees a mixed batch of applications of which some have very high memory demands, while most have only low or moderate demands. Consequently, instead of paging directly to a slow local disk, one could significantly reduce access latencies by first paging over a high-speed LAN to the unused memory of remote machines and then turn to disk-based paging only as the last resort after exhausting the available remote memory. Remote memory access can be viewed as another level in the traditional memory hierarchy which fills the widening performance gap between very low latency access to main memory and high latency access to local disk.

Recent years have also seen a phenomenal rise in affordable gigabit Ethernet LANs that provide low latency, support for jumbo frames (packet sizes greater than 1500 bytes), and offer attractive cost-to-performance ratios. An interesting question naturally follows from the above discussion: Can we transparently virtualize (or pool together) the collective unused memory of commodity nodes across a high-speed LAN and enable unmodified large memory applications to avoid the disk access bottleneck by using this collective memory resource? Prior efforts [6, 11, 10, 17, 19, 12, 20, 23] to address this problem have either relied upon expensive interconnect hardware (ATM/Myrinet/Infiniband) or used bandwidth limited 10/100 Mbps networks that are far too slow to provide meaningful application speedups. In addition, extensive changes were often required either to the large memory applications or the end-host operating system. Note that the above research question of transparent remote memory access is different from the research on Software Distributed Shared Memory (DSM) [9] systems that permits nodes in a network to behave as if they were shared memory multiprocessors, often requiring use of customized application programming interfaces.

Experiences in the design, implementation and evaluation of the Adaptive Network Memory Engine (Anemone) system are described. Anemone virtualizes the collective unused memory resources across nodes in a commodity gigabit Ethernet LAN and allows unmodified memory-hungry applications to transparently benefit from low-overhead access to potentially "unlimited" remote memory resources. The Anemone system makes the following specific contributions. (1) Anemone presents a unified virtual interface for each memory client to access an aggregated pool of remote memory. (2) Any application can benefit from Anemone without requiring any code changes, recompilation, or relinking. Anemone system is implemented in pluggable kernel modules and does not require any changes to the core operating system. (3) Anemone is designed to automatically adapt as the applications' memory requirements change and/or the cluster-wide memory resource availability changes. It effectively isolates the clients from changes in the aggregate memory pool and isolates the memory contributors from changes in client memory requirements. (4) To the best of our knowledge, Anemone system is the first attempt at evaluating the feasibility of remote memory access over commodity gigabit Ethernet with jumbo frame support.

Performance evaluations were conducted using two real-world unmodified applications—ray-tracing and large in memory sorting. Anemone reduces page-fault latencies by a factor of 19.6—from an average of 9.8 ms with disk based paging to about 500 μs with Anemone. Anemone speeds up single-process large-memory applications by a factor of 2 to 3 and multiple concurrent large-memory applications by a factor of 6 to 7.7.

2 ARCHITECTURE DETAILS

2.1 The Memory Engine

Figure 1:
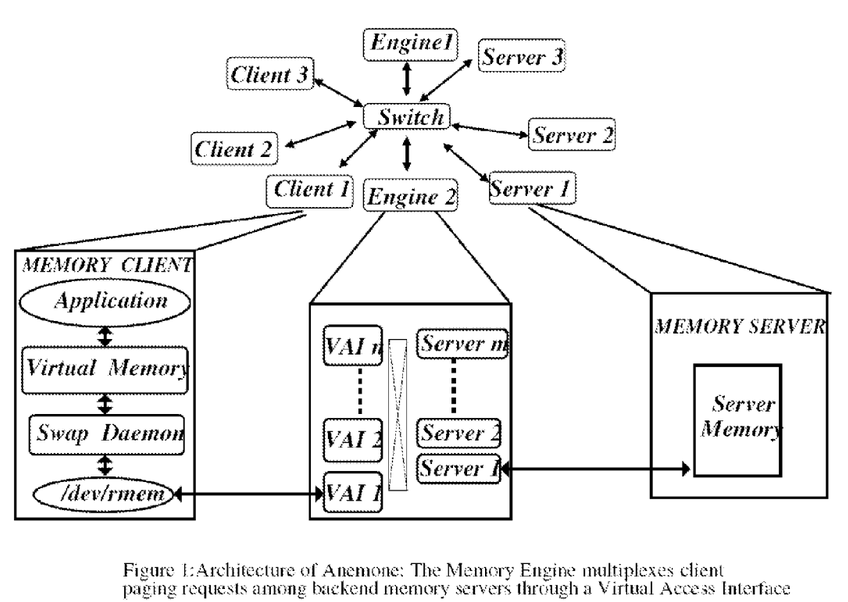
FIG. 1 shows a schematic diagram of an architecture of ANEMONE.

As shown in FIG. 1, Anemone contains three main components: Memory Engine, Memory Servers and Memory Clients. The memory engine is a dedicated entity for global memory resource management that coordinates the interaction between the clients executing large-memory applications and servers hosting remote memory. The memory engine itself is not the primary source of remote memory; rather it helps to pool together and present a unified access interface for the remote memory resources across the gigabit network.

The memory engine transparently maps the client memory requirements to available remote memory and hides the complexity of memory resource management from both memory clients and back-end servers. The memory engine uses a lightweight window-based Reliable Memory Access Protocol (RMAP) to communicate with both the memory clients and memory servers.

The client-side face of the memory engine consists of a number of Virtual Access Interfaces (VAI), which are logical devices (not physical devices) that memory clients use to access remote memory. Memory access requests from the client are sent using RMAP to this remote VAI device in the form of read/write requests. The engine can simultaneously support VAIs for multiple clients and also support multiple memory servers to contribute unused memory. Each VAI can have attributes such as logical capacity, priority, and reliability requirements.

Upon a write, the Client Module sends the page to the engine which forwards the page to be stored on one of the back-end memory servers. Successive pages, including pages from the same client, can be can be sent by the memory engine to any of the memory servers based upon different types of server selection algorithms. Upon a read, the client sends a read request to the memory engine which then looks up its internal mapping tables to locate the server holding the requested page, retrieves the page from that server, and transmits it to the client.

The memory engine also maintains a cache of frequently accessed pages that it searches first before contacting a memory server. The memory engine uses a hash table to map clients' pages to servers. The hash key (a page's identity) is composed of the triplet: {Client IP address, Offset, VAI id}. The engine can host many VAIs, each having one VAI id. The offset in the triplet is specified in clients' read/write requests. The engine maintains a small request queue for each client to service groups of read/write requests. Since the engine can handle any number of servers, acknowledgment pages coming from different servers destined for a particular client may arrive out of order. Hence, the queue is searched upon receipt of a reply from a server. This allows for a pipelined stream of page data from multiple servers, to be returned to the client.

2.2 The Memory Servers

The memory servers store client's data pages that are forwarded by the memory engine. Servers may or may not be a general purpose machine in the cluster. Each memory server can choose to set aside a portion of its unused memory for use by remote clients. Depending upon each server's own memory requirements, the amount of contributed memory may change dynamically in coordination with the memory engine. The memory engine balances the load among multiple memory servers based upon a usage to capacity ratio. A more complete criteria might include ratio of number of pages stored at each server to its contributed capacity, the frequency of read requests being made to each server, or the CPU utilization at each server. Just like the engine, each server also uses a hash-table, keyed by the identity of a page. The difference is that the data attached to a unique key in the engine is the location of a page, whereas it is the page itself in the server.

2.3 Memory Client

To maintain transparency for large-memory applications, the memory client is designed as a pseudo block device (PBD) that appears to be a regular block device to the client system, while in reality it is a convenient frontend to transparently manage remote memory access. The PBD is configured as a primary swap partition to which the swap daemon can send read/write requests at runtime in response to page-faults from large memory applications. The virtual memory subsystem interacts with the swap daemon to page-out/page-in memory contents to/from the PBD. The fact that the primary swap device is in fact remote memory of one or more memory servers is transparent to both the application and swap daemon. The PBD is a self-contained pluggable kernel module that transparently sits above the network device driver and does not require any changes either to the memory-intensive application or to the client's operating system. The PBD includes a small write-back cache to store often requested pages locally and a pending queue of requests to be sent out to the VAI. The size of the cache and the queue together is bounded to a preallocated 16 MB of memory to avoid creating additional memory pressure. For write requests, if the page already resides in the cache or if there is space available, then the page is written to cache. If the number of pages in the cache exceeds a high water mark, victim pages are evicted based on LRU policy. For read requests, a page that already resides in the cache is returned directly to the swap daemon. Upon a cache miss, the read request is forwarded to the VAI. If the cache and the pending request queue are full, the swap daemon needs to wait because requests are being generated faster than can be transmitted reliably.

2.4 Reliable Memory Access Protocol

The choice of communication protocol in Anemone is guided by the following considerations. Use of TCP for reliable communication turns out to be too expensive because it incurs an extra layer of processing in the networking stack. Anemone also does not need TCP's features of congestion control and in-order byte-stream delivery. Additionally, Anemone does not need network-layer IP routing functionality because it operates within a LAN. The need for packet fragmentation is eliminated because gigabit networks support the use of Jumbo frames which allow MTU (Maximum Transmission Unit) sizes larger than 1500 bytes (typically between 9 KB and 16 KB). Thus, an entire 4 KB or 8 KB memory page, including headers, can fit inside a single jumbo frame.

Consequently, Anemone uses its own reliable window-based datagram protocol, called RMAP, for communication, but without the requirement of in-order delivery. All the communication modules (in the clients, engine and the servers) operate right above the network device driver. The RMAP implementation includes five network functions. REG{ister} and UNREG{ister} connect and disconnect a client with the memory engine. When the engine receives a REG request it allocates a VAI and returns a file handle for it. When the engine receives an UNREG request it deallocates the VAI and all meta-data associated with that client and frees remote pages belonging to the clients. READ, WRITE and their associated ACK messages provide basic reliability for reading and writing between the clients, engine and servers. If a READ/WRITE communication does not receive its associated acknowledgment after a given amount of time, the request is retransmitted. Finally a STAT function is made available to allow the client to gather information about its corresponding VAI(s) in the engine, such as available memory and average workload.

A lightweight flow control strategy has also been implemented in RMAP. As paging requests arrive from the client's swap daemon, a fixed size FIFO transmission queue fills up.

To empty the transmission queue the client module uses a window to limit the number of outstanding network memory requests. When the queue is full, the client stalls any upper layer paging activity until ACKs come in and shrink the queue. These ACKs are allowed to arrive out-of-order. The RMAP implementation also provides several other tunable parameters. The first parameter is the window size which controls the number of packets waiting for acknowledgment in the transmission queue. The second parameter is a retransmission timeout which triggers RMAP to check if there are any packets awaiting retransmission. The third parameter is the per packet retransmission latency, i.e. the amount of time between successive retries of the same request. Finally, the fourth parameter specifies the wait latency between successive packet transmissions.

2.5 Kernel-Space Specifics

Anemone's implementation sits directly on top of the data link layer. In Linux, a software-based interrupt mechanism, called a softirq, handles the demultiplexing of incoming packets for Layer-3 protocols. The Anemone module uses a Linux hook, called NetFilter, to receive Anemone-specific packets after the softirq fires. From here, Anemone processes the request, schedules communication and returns control to the kernel all in one shot. The hash-tables used in the engine and server consume very little memory. The number of buckets in the hashtable remains static upon startup and are allocated using the get free pages( ) call. Linked-lists contained within each bucket hold bucket entries managed by the Linux slab allocator, (instead of the kmalloc( ) mechanism which causes fragmentation).

3 PERFORMANCE

3.1 Anemone Testbed

An experimental prototype involves 8 machines: one client, one engine, and six memory servers, with more nodes being added as we write this paper. The client, engine and server components are implemented in Linux 2.6 using loadable kernel modules. All machines contain 2.6-3.0 GHz Pentium Xeon processors. The client machine has 256 MB of memory, Server 1 has 2.0 GB, Server 2 has 3.0 GB, Servers 3 through 6 have 1.0 GB of memory, and the Engine has 1.0 GB. All machines use Intel Pro/1000 MT gigabit network cards and are connected by an 8-port SMC Networks gigabit Ethernet switch supporting jumbo frames. For disk based tests, we used a Western Digital WD400BB disk with 40 GB capacity and 7200 RPM speed. Of the 8 GB of remote memory available to use, the server machines themselves consume a significant part for kernel memory. A header is attached to each 4 KB page received and stored by the servers. The slab allocator assigns a complete 4 KB page to this extra header in addition to the 4 KB page of data, thus reducing the effective remote memory available to less than 4.0 GB. We plan to incorporate a scatter/gather style solution to this issue by using the Linux slab allocator to separate the header from the page data.

3.2 Components of Page-in Latency

A page-in operation is more time-critical than page-out operation because application cannot proceed without the page. Here, we examine the various components of the latency involved in processing a page-in request using Anemone. A request for a 4 KB page involves the following steps: (1) A request is transmitted from the client to the engine. (2) The engine requests the page from a server. (3) The server returns the requested page to the engine. (4) The engine returns the page back to the client. The entire sequence requires 4 network transmissions. Table 1 shows the average amount of time consumed at each of these 4 stages over 1000 different randomized read requests to the Anemone system providing 2 GB of remote memory. It turns out that the actual computation overhead at the client, the engine and the server is negligibly small: less than 10 microseconds. The majority of the latency involved is spent in the client-engine and engine-server communication.

TABLE 1

Latency Components for Anemone

| Component | Avg. Latency |
|---|---|
| Round Trip Time | 496.7 µs |
| Engine/Client Communication | 235.4 µs |
| Client Computation | 3.36 µs |
| Engine Computation | 5.4 µs |
| Engine/Server Communication | 254.6 µs |
| Server Computation | 1.2 µs |
| Disk: | 9230.92 µs |

The client latency includes making a read/write request either via the swap daemon or via a system call, invoking the client module and sending off the request to the engine. The computation values are measured by time-stamping the request when it is generated and subtracting the timestamp when the request is completed.

For the engine, this time includes the difference between the time the page-out/page-in request is received and the time when it finally responds to the client with an ACK or a data page. For the server, it is simply the difference between time the request for the page arrives and the time the reply is transmitted back to the engine. These computation times are also small and clearly demonstrate the bottleneck the network creates.

The total round trip paging latency for Anemone is consistently around 500 microseconds, with around 250 microseconds between each hop. The time spent in completing a ping request on our network between two machines takes an average of 150 microseconds, which is a good lower-bound on how fast Anemone can get using our RMAP protocol. Hence, there is still about 100 microseconds of room to improve in Anemone at each round trip hop, when compared to a baseline ping. Furthermore, the time to place 4k bits on a gigabit link is not much more than 4 microseconds, which means that a great deal of the transmission time is spent in sending transmission/receiving interrupts, allocating ring buffers and sending the data over the bus to the NIC. Optimizing these pieces is not easy to do without significant modifications. Conclusively, the kernel-based version of Anemone is 19.6 times faster than disk-based block requests that require seek/rotation.

3.3 Latency Distribution

Figure 2:
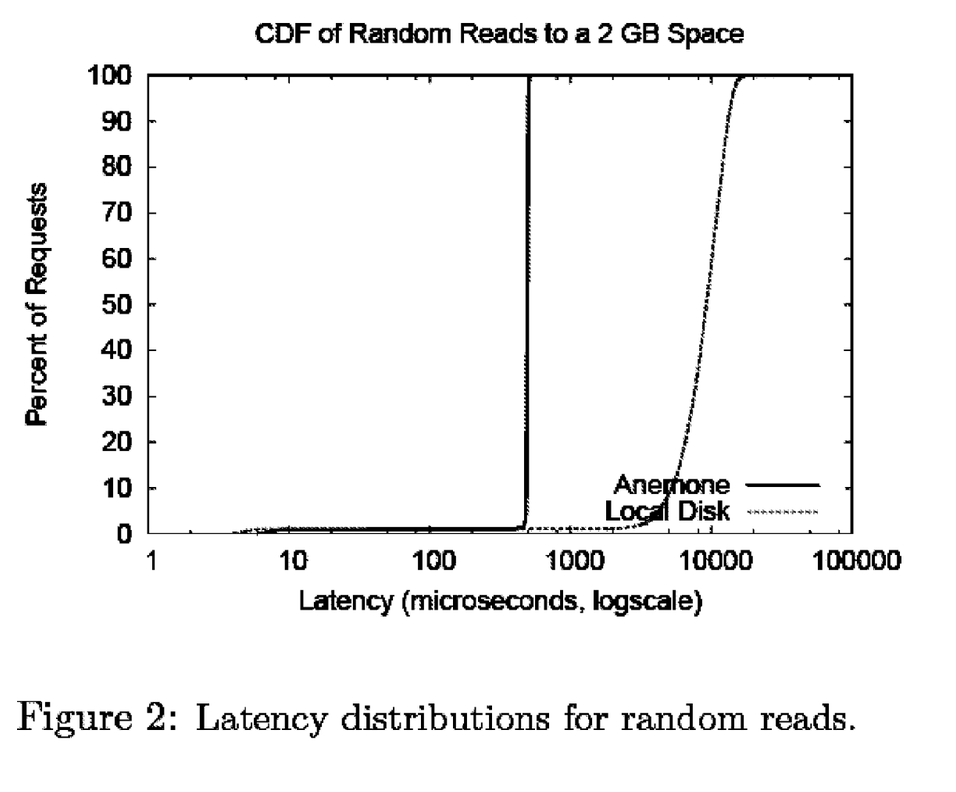
FIG. 2 shows a graph of latency distributions for random reads.
Figure 3:
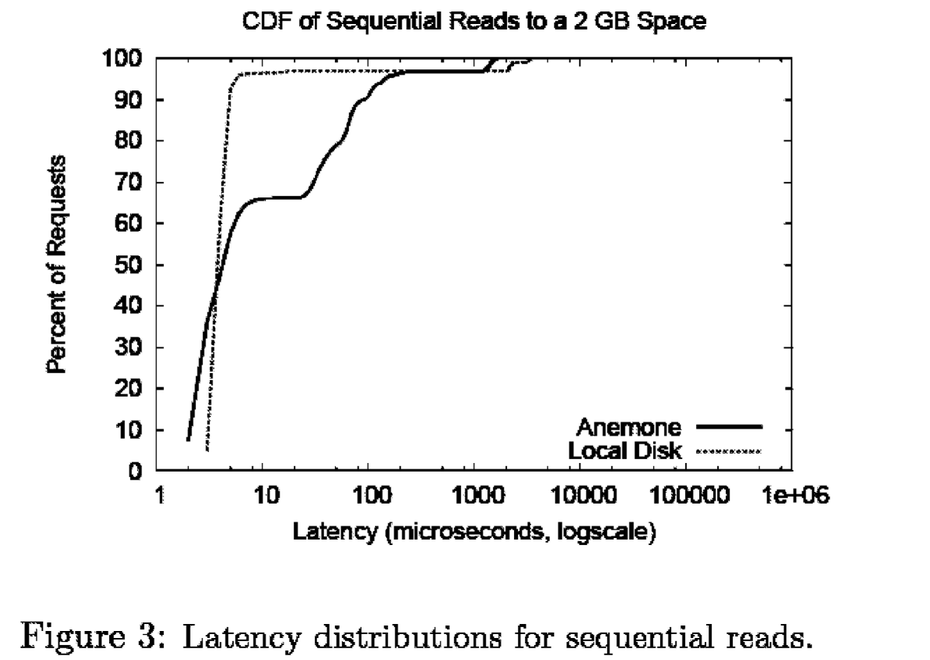
FIG. 3 shows a graph of latency distributions for sequential reads.

In order to compare read/write latencies obtained with Anemone against those obtained with disk, we next plot the distribution of observed read and write latencies for sequential and random access patterns. FIGS. 2 and 3 compare the cumulative distributions of latencies with disk and Anemone for random and sequential reads respectively. Though real-world applications rarely generate purely sequential or completely random memory access patterns, these graphs provide a useful measure to understand the underlying factors that impact application execution times. For random read requests in FIG. 2, most requests to disk experience a latency between 5 to 10 milliseconds. On the other hand most requests in Anemone experience only around a 500 microsecond latency. In our most recent experiments with a distributed Anemone architecture, we have measured even lower latencies of 210 microseconds due to absence of the memory engine. For sequential read requests in FIG. 3, the disk shows a slightly superior latency distribution than Anemone. Most sequential requests are serviced by disk within 3 to 5 microseconds because sequential read accesses fit well with the motion of the disk head, eliminating seek and rotational overheads. In contrast, Anemone still delivers a range of latency values (most of them still around 500 microseconds), mainly because network communication latency dominates, though it is masked to some extent by the prefetching performed by the swap daemon or file system. The write latency distributions for both disk and Anemone are observed to be very similar. Most latencies are close to 10 microseconds because writes typically return after writing to the buffer cache. Due to space constraints, the corresponding figures for write latency distribution can be found in [15].

3.4 Single Large Memory Processes

Figure 4:
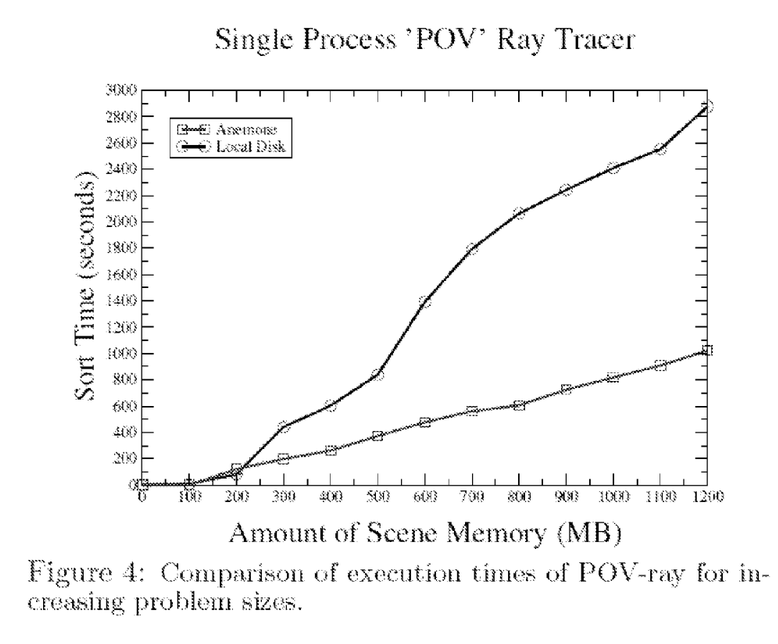
FIG. 4 shows a graph of a comparison of execution times of POV-ray for increasing problem sizes.
Figure 5:
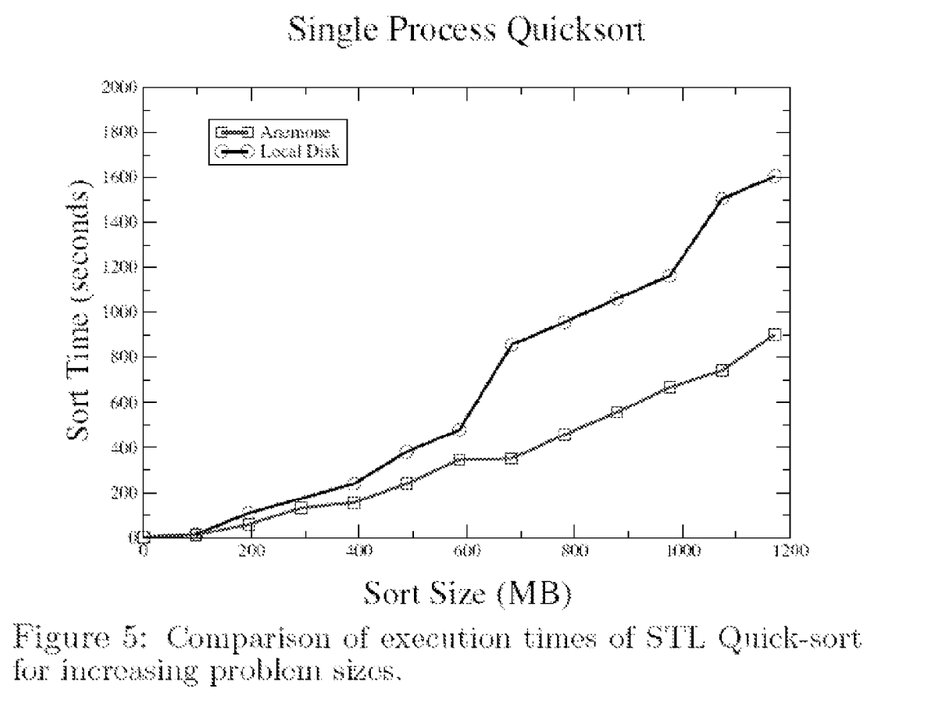
FIG. 5 shows a graph of a comparison of execution times of STL Quick-sort for increasing problem sizes.

This section evaluates the performance improvements seen by two unmodified single process large memory applications using the Anemone system. The first application is a graphics rendering program called POV-Ray [21]. The POV-Ray application was used to render a scene within a square grid of ¼ unit spheres. The size of the grid was increased gradually to increase the memory usage of the program in 100 MB increments. FIG. 4 shows the completion times of these increasingly large renderings up to 1.2 GB of memory versus the disk using an equal amount of local swap space. The figure clearly shows that Anemone delivers increasing application speedups with increasing memory usage and is able to improve the execution time of a single-process POV-ray application by a factor of up to 2.9 for 1.2 GB memory usage. The second application is a large in-memory Quick-sort/ introsort program that uses an STL-based implementation from SGI [22], with a complexity of O (N log N) comparisons. We sorted randomly populated large in-memory arrays of integers. FIG. 5 clearly shows that Anemone again delivers application speedups by a factor of up to 1.8 for single-process Quicksort application having 1.2 GB memory usage.

3.5 Multiple Concurrent Processes

Figure 6:
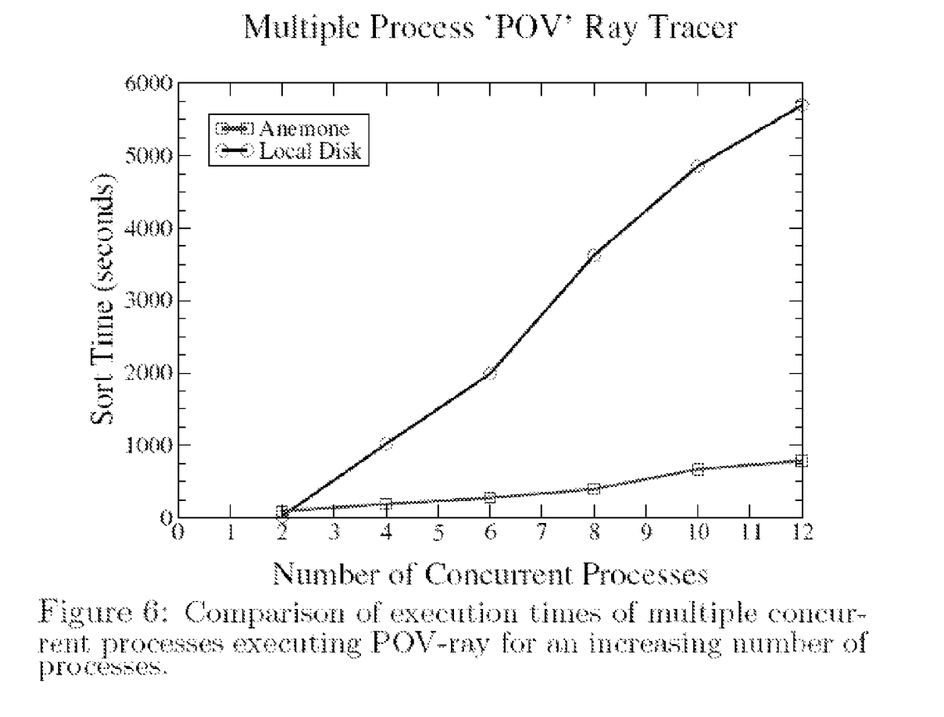
FIG. 6 shows a graph of a comparison of execution times of multiple concurrent processes executing POV-ray for an increasing number of processes.
Figure 7:
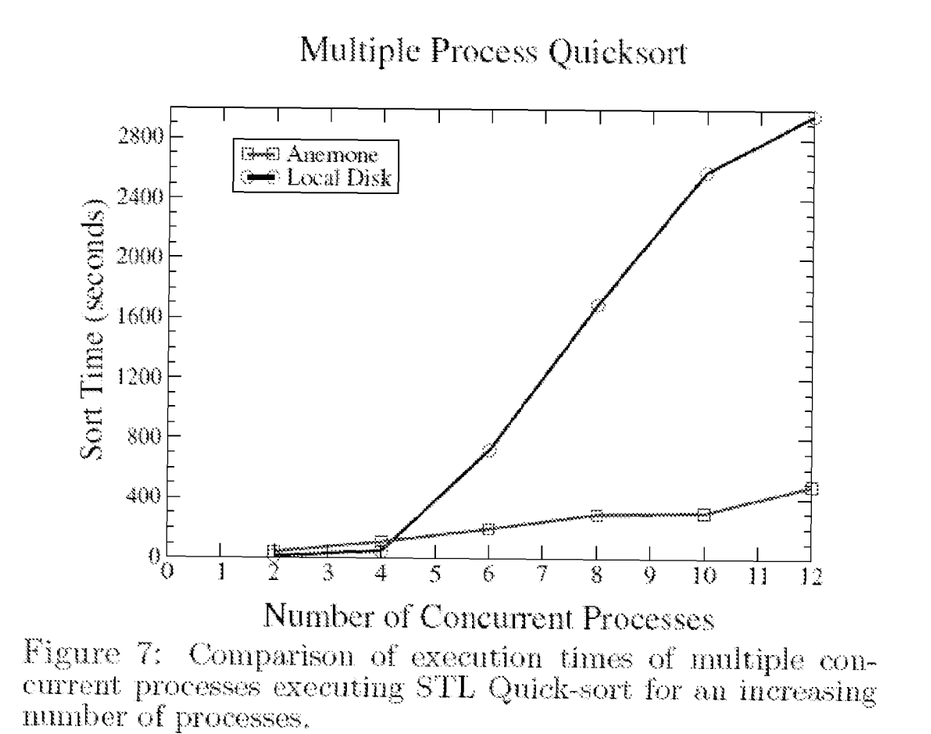
FIG. 7 shows a graph of a comparison of execution times of multiple concurrent processes executing STL Quick-sort for an increasing number of processes.

In this section, the performance of Anemone was tested under varying levels of concurrent application execution. Multiple concurrently executing memory-intensive processes tend to stress the system by competing for computation, memory and I/O resources and by disrupting any sequentiality in paging activity. FIGS. 6 and 7 show the execution time comparison of Anemone and disk as the number of POV-ray and Quick-sort processes increases. The execution time measures the time interval between the start of the multiple process execution and the completion of last process in the set. Each process consumes 100 MB of memory. As the number of processes increases, the overall remote memory usage also increases. The figures show that execution times using disk-based swap increase steeply with an increasing number of concurrent processes. This is because the paging activity gradually loses the sequential access property as the number of processes increases. This makes the disk seek and rotational overheads a dominant factor in disk I/O latency. On the other hand, Anemone reacts very well to concurrent system activity and the total execution time increases very slowly. This is because, unlike disk based paging, Anemone encounters an almost constant paging latency over the network even as the paging activity loses sequentiality of access. With 12 concurrent memory-intensive processes, Anemone achieves speedups of a factor of 7.7 for POV-ray and a factor of 6.0 for Quick-sort.

4 RELATED WORK

Anemone is the first system that provides unmodified large memory applications with completely transparent and virtualized access to cluster wide remote memory over commodity gigabit Ethernet LANs. The earliest efforts at harvesting idle remote memory resources aimed to improve memory management, recovery, concurrency control and read/write performance for in-memory database and transaction processing systems [14, 13, 4, 16]. The first two remote paging mechanisms [6, 11] incorporated extensive OS changes to both the client and the memory servers and operated upon 10 Mbps Ethernet. The Global Memory System (GMS) [10] was designed to provide network-wide memory management support for paging, memory mapped files and file caching. This system was also closely built into the end-host operating system and operated upon a 155 Mbps DEC Alpha ATM Network. The Dodo project [17, 1] provides a user-level library based interface that a programmer can use to coordinate all data transfer to and from a remote memory cache. Legacy applications must be modified to use this library.

Work in [19] implements a remote memory paging system in the DEC OSF/1 operating system as a customized device driver over 10 Mbps Ethernet. A remote paging mechanism [20] specific to the Nemesis [18] operating system was designed to permit application-specific remote memory access and paging. The Network RamDisk [12] offers remote paging with data replication and adaptive parity caching by means of a device driver based implementation.

Other remote memory efforts include software distributed shared memory (DSM) systems [9]. DSM systems allow a set of independent nodes to behave as a large shared memory multi-processor, often requiring customized programming to share common objects across nodes. This is much different from the Anemone system which allows pre-compiled high-performance applications to execute unmodified and use large amounts of remote memory provided by the cluster. Samson [23] is a dedicated memory server over Myrinet interconnect that actively attempts to predict client page requirements and delivers the pages just-in-time to hide the paging latencies. The drivers and OS in both the memory server and clients are also extensively modified.

Simulation studies for a load sharing scheme that combines job migrations with the use of network RAM are presented in [25]. The NOW project [2] performs cooperative caching via a global file cache [8] in the xFS file system [3] while [24] attempts to avoid inclusiveness within the cache hierarchy. Remote memory based caching and replacement/replication strategies have been proposed in [5, 7], but these do not address remote memory paging in particular.

5 CONCLUSIONS

The design, implementation and evaluation of the Adaptive Network Memory Engine (Anemone) system that enables unmodified large memory applications to transparently access the collective unused memory resources of nodes across a gigabit Ethernet LAN is presented. A working Anemone prototype was implemented and performance evaluations conducted using two unmodified real-world applications, namely, ray-tracing and large in-memory sorting. When compared to disk-based paging, Anemone speeds up single process applications by a factor of 2 to 3 and multiple concurrent processes by a factor of 6 to 7.7. The scalability and fault tolerance of Anemone might be improved using a completely peer-to-peer memory sharing architecture which does not include a memory engine. The reliability of Anemone might be improved using page replication for higher availability. Another promising direction is to use compression of pages to reduce communication and increase the effective memory capacity.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

REFERENCES

[1] A. Acharya and S. Setia. Availability and utility of idle memory in workstation clusters. In Measurement and Modeling of Computer Systems, pages 35-46, 1999.
[2] T. Anderson, D. Culler, and D. Patterson. A case for NOW (Networks of Workstations). IEEE Micro, 15(1):54-64, 1995.
[3] T. Anderson, M. Dahlin, J. Neefe, D. Patterson, D. Roselli, and R. Wang. Serverless network file systems. In Proc. of the 15th Symp. on Operating System Principles, pages 109-126, Copper Mountain, Colo., December 1995.
[4] P. Bohannon, R. Rastogi, A. Silberschatz, and S. Sudarshan. The architecture of the Dali main memory storage manager. Bell Labs Technical Journal, 2(1):36-47, 1997.
[5] F. Brasileiro, W. Cirne, E. B. Passos, and T. S. Stanchi. Using remote memory to stabilise data efficiently on an EXT2 linux file system. In Proc. of the 20th Brazilian Symposium on Computer Networks, May 2002.
[6] D. Comer and J. Griffoen. A new design for distributed systems: the remote memory model. Proceedings of the USENIX 1991 Summer Technical Conference, pages 127-135, 1991.
[7] F. M. Cuenca-Acuna and T. D. Nguyen. Cooperative caching middleware for cluster-based servers. In Proc. of 10th IEEE Intl. Symp. on High Performance Distributed Computing (HPDC-10), August 2001.
[8] M. Dahlin, R. Wang, T. E. Anderson, and D. A. Patterson. Cooperative caching: Using remote client memory to improve file system performance. In Operating Systems Design and Implementation, pages 267-280, 1994.
[9] S. Dwarkadas, N. Hardavellas, L. Kontothanassis, R. Nikhil, and R. Stets. Cashmere-VLM: Remote memory paging for software distributed shared memory. In Proc. of Intl. Parallel Processing Symposium, San Juan, Puerto Rico, pages 153-159, April 1999.
[10] M. Feeley, W. Morgan, F. Pighin, A. Karlin, H. Levy, and C. Thekkath. Implementing global memory management in a workstation cluster. Operating Systems Review, Fifteenth ACM Symposium on Operating Systems Principles, 29(5):201-212, 1995.
[11] E. Felten and J. Zahorjan. Issues in the implementation of a remote paging system. Technical Report TR 91-03-09, Computer Science Department, University of Washington, 1991.
[12] M. Flouris and E. P. Markatos. The network RamDisk: Using remote memory on heterogeneous NOWs. Cluster Computing, 2(4):281-293, 1999.
[13] H. Garcia-Molina, R. Abbott, C. Clifton, C. Staelin, and K. Salem. Data management with massive memory: a summary. Parallel Database Systems. PRISMA Workshop, pages 63-70, 1991.
[14] H. Garcia-Molina, R. Lipton, and J. Valdes. A massive memory machine. IEEE Transactions on Computers, C-33 (5):391-399, 1984.
[15] M. Hines, M. Lewandowski, J. Wang, and K. Gopalan. Implementation experiences in transparently harnessing cluster-wide memory. Technical Report TR-060606, Computer Science Dept., Florida State University, June 2006.
[16] S. Ioannidis, E. P. Markatos, and J. Sevaslidou. On using network memory to improve the performance of transaction-based systems. In International Conference on Parallel and Distributed Processing Techniques and Applications (PDPTA '98), 1998.
[17] S. Koussih, A. Acharya, and S. Setia. Dodo: A userlevel system for exploiting idle memory in workstation clusters. In Proc. of the Eighth IEEE Intl. Symp. on High Performance Distributed Computing (HPDC-8), 1999.
[18] I. M. Leslie, D. McAuley, R. Black, T. Roscoe, P. T. Barham, D. Evers, R. Fairbairns, and E. Hyden. The design and implementation of an operating system to support distributed multimedia applications. IEEE Journal of Selected Areas in Communications, 14(7):1280-1297, 1996.
[19] E. P. Markatos and G. Dramitinos. Implementation of a reliable remote memory pager. In USENIX Annual Technical Conference, pages 177-190, 1996.
[20] I. McDonald. Remote paging in a single address space operating system supporting quality of service. Tech. Report, Dept. of Computing Science, University of Glasgow, Scotland, UK, 1999.
[21] POV-Ray. The persistence of vision raytracer, http://povray.org/, 2005.
[22] Inc. Silicon Graphics. STL Quicksort, http://www.sgi.com/tech/stl/sort.html.
[23] E. Stark. SAMSON: A scalable active memory server on a network, http://bsd7.starkhome.cs.sunysb.edu/_samson/, August 2003.
[24] T. M. Wong and J. Wilkes. My cache or yours? Making storage more exclusive. In Proc. of the USENIX Annual Technical Conference, pages 161-175, 2002.
[25] L. Xiao, X. Zhang, and S. A. Kubricht. Incorporating job migration and network RAM to share cluster memory resources. In Proc. of the 9th IEEE Intl. Symposium on High Performance Distributed Computing (HPDC-9), pages 71-78, August 2000.

The invention claimed is:
1. A distributed remote memory access system, comprising:
  (1) a client communication network interface to a packet data communication network subject to packet loss, which is adapted to operate without communication of an acknowledgement packet in response to a successful communication of a data packet,
  (2) a client having a client memory in adapted to store memory pages, and
  (3) a reliable client remote memory access protocol, adapted to:
    when a memory page is to be evicted from said client memory, communicate said memory page to a cooperating server through the client communication network interface network, and after receipt of an acknowledg- ment of successful communication of the memory page, evict said memory page from said client memory, and when said evicted memory page is required at said client memory, communicate through said client communication network interface, destined to the cooperating server, a request for said evicted memory page and control retrieval of said evicted memory page from the cooperating server to said client memory.

2. The distributed remote memory access system according to claim 1, further comprising:
   (b) at least one cooperating server, said cooperating server comprising:
      (1) a server remote memory access protocol,
      (2) a server memory contributed for use by a client,
      (3) a hash table, storing a location of evicted memory pages from the client, and
      (4) a server interface to the packet data communication network,
   wherein said server remote memory access protocol is adapted to:
      control a receipt of evicted memory pages received through said server packet data communication network interface from a client which are stored in said server memory,
      update said hash table to store a location of said stored evicted memory page,
      retrieve requested portions of said evicted memory pages from said server memory based on said hash table, and
      transmit said retrieved evicted memory pages through said server communication network interface.

3. The distributed remote memory access system according to claim 1, further comprising a retransmission timer, configured to trigger a retransmission of the memory page if an acknowledgment of successful communication of the memory page is not received.

4. A server for a distributed memory system, comprising:
   (1) a server remote memory access protocol;
   (2) a server memory;
   (3) a hash table, storing a location of evicted memory pages from a cooperating client; and
   (4) a server network interface, to a packet data communication network subject to packet loss, which is adapted to operate without communication of an acknowledgement packet in response to a successful communication of a data packet,
   the server being configured:
      to store evicted memory pages from the cooperating client received through said server network interface under control of said server remote memory access protocol in said server memory,
      to send a confirmation of receipt message through the server network interface to the cooperating client,
      to update said hash table to store an identification of the location of said stored evicted memory page,
      to permit retrieval of requested portions of said evicted memory pages from said server memory based on said hash table,
      to transmit retrieved requested portions of said evicted memory pages through said server network interface under control of said server remote memory access protocol layer, and
      to evict transmitted portions of said memory pages from said server memory after receipt of a confirmation of receipt message from the cooperating client.

5. The server for a distributed memory system according to claim 4, wherein said server comprises a retransmission timer, and is further configured to trigger a retransmission of the requested portion of said memory page if an acknowledgment of successful communication of the memory page is not received from the cooperating memory client.

6. A server for a distributed remote memory access system, in combination with at least one client, said client comprising:
   (1) a cache memory,
   (2) a client remote memory access protocol, and
   (3) a client communication network interface to a packet data communication network subject to packet loss, which is adapted to operate without communication of an acknowledgement packet in response to a successful communication of a data packet,
   wherein said client is configured such that, when a memory page is evicted from said cache memory, it is communicated, under control of said client remote memory access protocol, destined to a cooperating server through the packet data communication network, and evicted from memory only after receipt of a confirmation of receipt message, and when said evicted memory page is required, a request is made under control of said client remote memory access protocol, destined to the cooperating server, to request and control retrieval of said evicted memory page and upon successful receipt sent a confirmation of receipt message to the cooperating server.

7. The server for a distributed remote memory access system, in combination with at least one client according to claim 6, said client further comprising a retransmission timer, said client being further configured to trigger a retransmission of the memory page if an acknowledgment of successful communication of the memory page is not received from the cooperating server.

8. A method for operating a distributed memory system, comprising:
   evicting a memory page from a cache memory of a computing device after receipt of a confirmation message of successful remote receipt of the evicted memory page;
   communicating, under control of a client remote memory access protocol, the memory page to a network system through a communication network interface to a packet data communication network subject to packet loss, which is adapted to operate without communication of an acknowledgement packet in response to a successful communication of a data packet;
   storing, on a network device, information to identify the at least one cooperating server receiving the evicted memory page; and
   requesting, under control of the client remote memory access protocol, retrieval of the evicted memory page, from the at least one cooperating server identified by the stored identifying information.

9. A tangible computer readable software medium for controlling a general purpose processor to perform the method of claim 8.

10. The method according to claim 8, wherein the memory page is retransmitted, before being evicted from cache memory, if an acknowledgment packet in response to a successful communication of a data packet comprising the memory page is not received within a predetermined timeout.

* * * * *